United States Patent
Charles et al.

(10) Patent No.: US 8,537,722 B2
(45) Date of Patent: Sep. 17, 2013

(54) DETECTION OF DATA RECEIVED BY A MASTER DEVICE IN A SINGLE-WIRE COMMUNICATION PROTOCOL

(75) Inventors: Alexandre Charles, Auriol (FR); Jérôme Conraux, Trets (FR); Alexandre Malherbe, Trets (FR); Alexandre Tramoni, Saint Aygulf (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 950 days.

(21) Appl. No.: 12/419,274

(22) Filed: Apr. 6, 2009

(65) Prior Publication Data

US 2009/0252068 A1 Oct. 8, 2009

(30) Foreign Application Priority Data

Apr. 8, 2008 (FR) ...................................... 08 52330

(51) Int. Cl.
*H04B 1/56* (2006.01)
(52) U.S. Cl.
USPC .......................................... 370/276; 370/252

(58) Field of Classification Search
None
See application file for complete search history.

(56) References Cited

U.S. PATENT DOCUMENTS

| | | | |
|---|---|---|---|
| 4,159,448 A | 6/1979 | Parham | |
| 5,903,607 A | 5/1999 | Tailliet | |
| 2004/0049616 A1* | 3/2004 | Dunstan et al. | 710/100 |
| 2005/0151248 A1* | 7/2005 | Shau | 257/734 |
| 2008/0049606 A1 | 2/2008 | Rhelimi et al. | |
| 2008/0217076 A1 | 9/2008 | Kraemer et al. | |

OTHER PUBLICATIONS

French Search Report dated Feb. 10, 2009 from French Patent Application No. 08/52330.

* cited by examiner

*Primary Examiner* — Pao Sinkantarakorn
(74) *Attorney, Agent, or Firm* — Wolf, Greenfield & Sacks, P.C.

(57) ABSTRACT

A method of determining, by a first device capable of transmitting a two-state signal over a single-wire connection to a second device, the binary state of data transmitted by the second device over said connection, the state being determined according to the slope of a rising edge of the two-state signal.

22 Claims, 3 Drawing Sheets

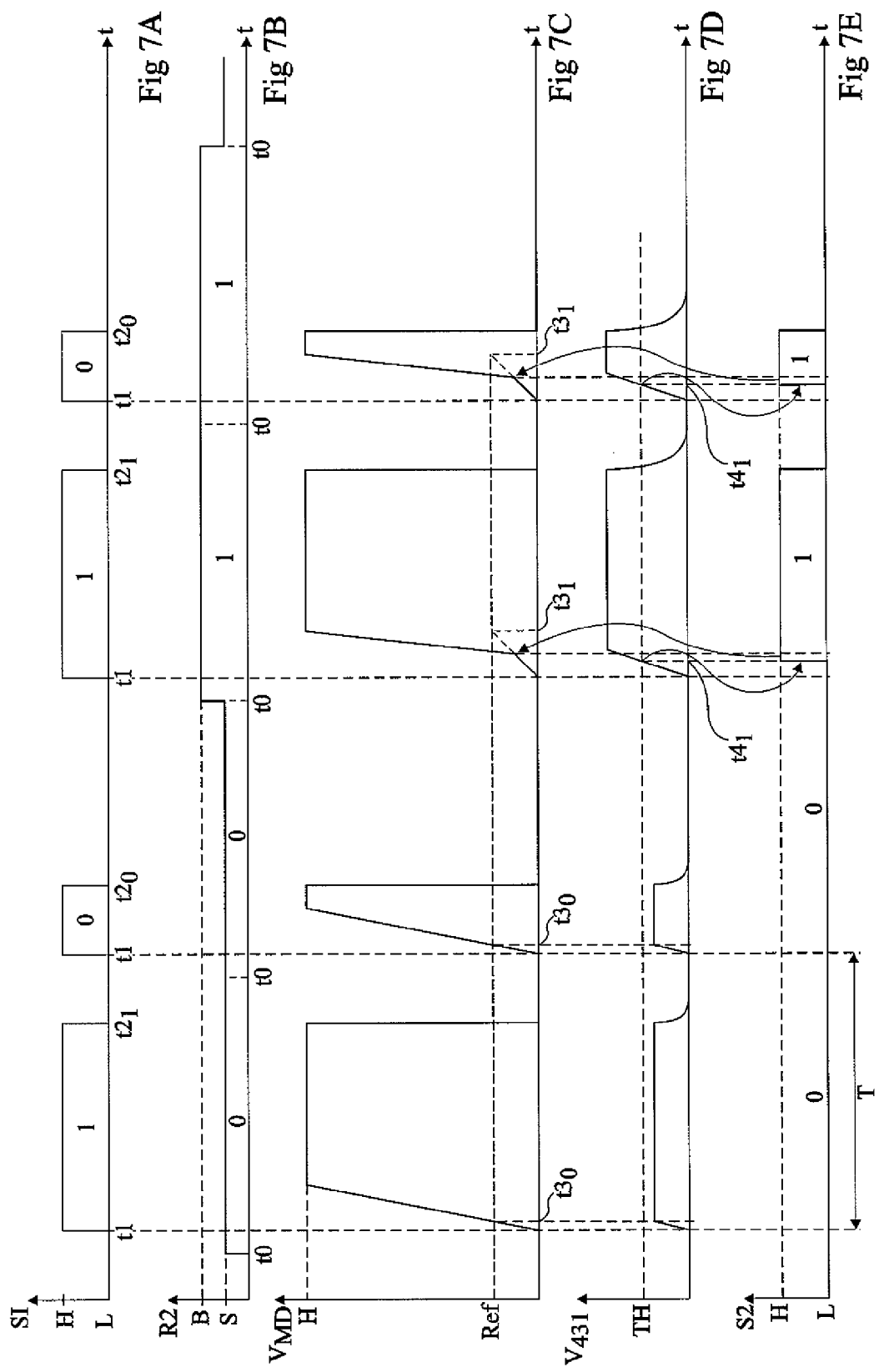

DETECTION OF DATA RECEIVED BY A MASTER DEVICE IN A SINGLE-WIRE COMMUNICATION PROTOCOL

CROSS REFERENCE TO RELATED APPLICATIONS

This application claims the priority benefit of French patent application number 08/52330, filed on Apr. 8, 2008, entitled "DETECTION OF DATA RECEIVED BY A MASTER DEVICE IN A SINGLE WIRE COMMUNICATION PROTOCOL," which is hereby incorporated by reference to the maximum extent allowable by law.

BACKGROUND OF THE INVENTION

1. Field of the Invention

The present invention relates generally to electronic circuits and, more specifically, to data transmissions between two devices over a single-wire connection. The present invention more specifically applies to systems implementing protocols known as single-wire protocols (SWP).

2. Discussion of the Related Art

Single-wire communication protocols are defined between a master device and a slave device sharing a single-wire connection to transmit data to each other in simultaneous bidirectional fashion (full duplex). Most often, the signal transmitted by the master device to the slave device further is a clock signal enabling synchronizing the exchanges. In the master-device-to-slave-device direction, the duty cycle of a periodic signal is modulated according to the binary state to be transmitted. In the slave-device-to-master-device direction, the slave device modulates the charge that it exhibits on the connection according to the binary states of the data that it transmits. The detection by the slave device occurs by measurement of the duty cycle. The detection by the master device occurs by comparing to a threshold the level of the current pulled by the slave device from the connection. The charge modulation by the slave device generally occurs at the rate of the periodic signal, by positioning of the charge during low states, so that the charge to be detected by the master device is present all along the high state of the signal.

Document U.S. Pat. No. 5,903,607 describes an example of a data coding and transmission between a master circuit and a slave circuit.

The communication rate in a single-wire protocol is linked, among others, to the delay necessary for the detection on the master device side. It needs to be awaited for the levels to settle, after the rising edges of the signal, to perform the comparison.

Further, a detection by level is sensitive to the line noise, which imposes a relatively large security margin to differentiate the levels.

SUMMARY OF THE INVENTION

It would be desirable to have a single-wire communication protocol which overcomes all or part of the disadvantages of usual systems.

It would in particular be desirable to have an increased communication rate.

It would further be desirable to have a detection mechanism, on the master device side, which is less sensitive to the line noise.

To achieve all or part of these objects as well as others, at least one embodiment of the present invention provides a method for determining, by a first device capable of transmitting a two-state signal over a single-wire connection to a second device, of the binary state of data transmitted by the second device over said connection, said state being determined according to the slope of a rising edge of said two-state signal.

According to an embodiment, the slope is determined based on the charge level of a capacitive element on occurrence of a rising edge.

According to an embodiment, the charge level is compared with a threshold to determine the received state.

According to an embodiment, the slope of the rising edge is broken for a first binary state and even for a second state.

According to an embodiment, the second device modulates the charge that it exhibits on the connection according to the binary state that it transmits.

According to an embodiment, said signal is used as a clock signal by the second device.

According to an embodiment, said signal has its duty cycle modulated according to data to be transmitted from the first device to the second one.

At least one embodiment of the present invention also provides a device of transmission-reception over a single-wire connection, capable of transmitting a two-state signal to another device modifying the charge that it exhibits on the connection according to the binary data state that it transmits in return, comprising:

an element for measuring information representative of the slope of the rising edges of said signal; and an element for comparing said information with a threshold.

According to an embodiment, the device further comprises an element for switching the power of an amplifier for transmitting said signal, activated after detection of a state corresponding to a charge of the second device.

The present invention also provides a system of simultaneous bidirectional transmission over a single-wire connection between a master device and a slave device.

The foregoing objects, features, and advantages of the present invention will be discussed in detail in the following non-limiting description of specific embodiments in connection with the accompanying drawings.

BRIEF DESCRIPTION OF THE DRAWINGS

FIGS. 7A to 7E are timing diagrams illustrating the operation of the circuit of FIG. 6.

DETAILED DESCRIPTION

Figure 1:
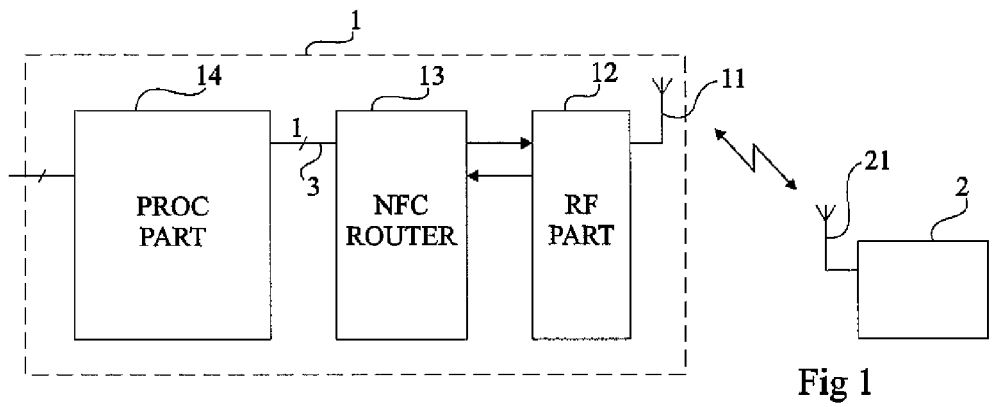
FIG. 1 is a block diagram of a radiofrequency communication system having at least one of its elements internally implementing a single-wire communication protocol between devices that it comprises.

The same elements have been designated with the same reference numerals in the different drawings, where the timing diagrams have been drawn out of scale. For clarity, only those steps and elements which are useful to the understanding of the present invention have been shown and will be described. In particular, the mechanisms of generation and exploitation of the data to be transmitted and of the received data have not been detailed, the present invention being compatible with usual mechanisms. Further, the different hardware systems and devices capable of implementing the described embodiments have not been detailed either, the implementation of the present invention being compatible with any system or device capable of implementing a single-wire protocol (SWP).

FIG. 1 is a block diagram of a system of radio frequency communication between a first element 1 and another element 2, each provided with a transceiver circuit to communicate by means of an antenna 11 or 21. It is, for example, a system of radiofrequency communication by inductive coupling. For example, element 2 is a radiofrequency tool of contactless card or reader type and element 1 is a similar object comprising a contact-type processing portion (secure identification module (SIM), cell phone processing circuit, etc.).

At least one of the elements (for example, element 1) comprises a so-called NFC router 13 (Near Field Communication) capable of managing communications between a radiofrequency part 12 (RF PART) and a processing part 14 (PROC PART). Router 13 has, among others, the object of being used as an interface between the radiofrequency part with which it bidirectionally communicates and processing part 14 with which it communicates over a single wire 3.

In this type of application, the full-duplex protocol used for the communication between router 13 and processing part 14 is an SWP protocol. The router behaves as a master device and sends data to circuit 14, which behaves as a slave device.

Figure 2:
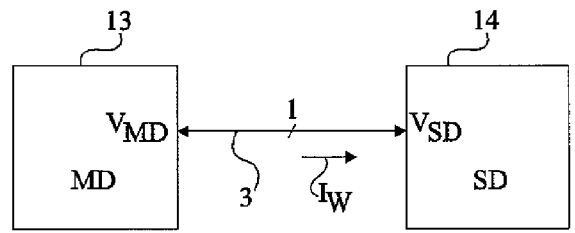
FIG. 2 is a block diagram of a system of single-wire communication between a master circuit and a slave circuit.

FIG. 2 shows a block diagram of an embodiment of a system of single-wire communication between a master device 13 (MD) and a slave device 14 (SD) via a single-wire connection 3. This drawing more generally illustrates that the embodiments which will be described can apply whatever the type of system, provided for it to exploit a single-wire communication protocol.

Figure 3:
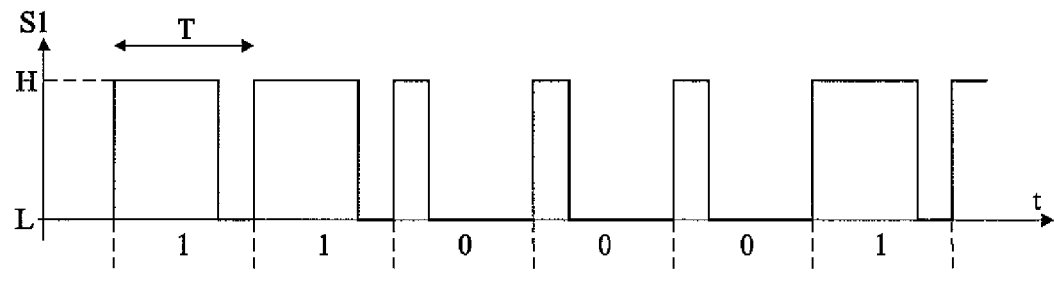
FIG. 3 illustrates an example of the shape of a data signal to be transmitted by the master device.

FIG. 3 is a timing diagram illustrating an example of the shape of a periodic signal S1 provided over line 3 by master device 13 and having a duty cycle which is a function of a train of digital data to be transmitted. In the example of FIG. 3, the transmission of a state 1 is performed by a high level H over approximately three quarters of clock period T (low level L over one quarter of period T) while the transmission of a state 0 is performed by a high level H over only on the order of one quarter of this clock period (low level L over the remaining three quarters). Signal S1 is transmitted by the master device by means of an output amplifier in the form of a voltage $V_{MD}$.

Figures 4A, 4B, 4C:
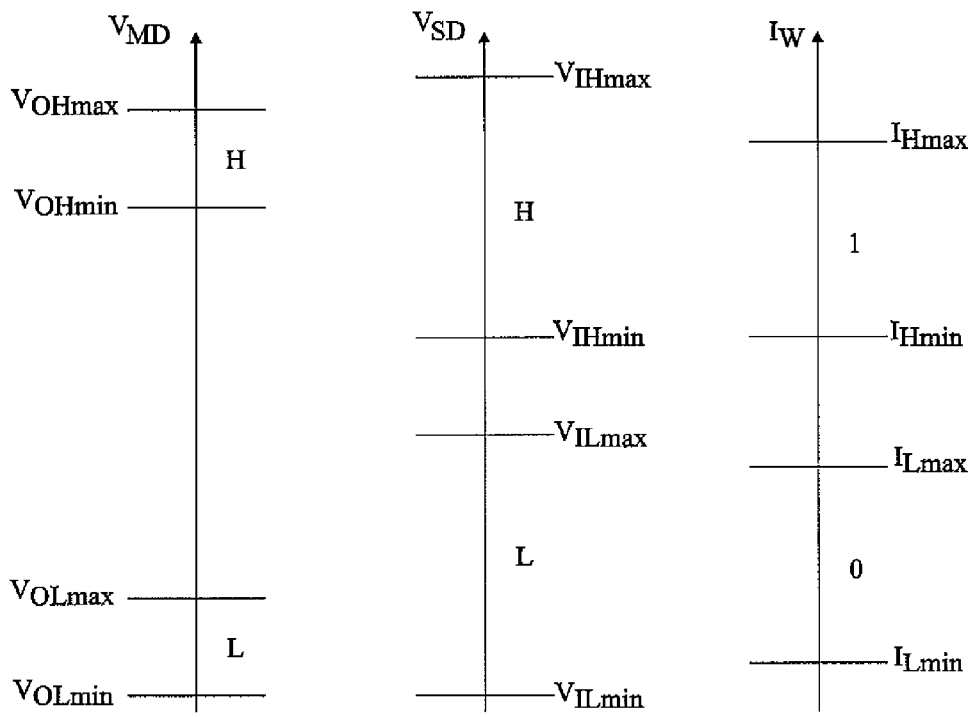
FIGS. 4A, 4B, and 4C illustrate an example of voltage and current levels in an application of near-field communication router type.

FIGS. 4A, 4B, and 4C illustrate an example of voltage and current levels used by a single-wire protocol to distinguish the transmitted binary states. These levels do not take into account the settling times of the signals.

FIG. 4A illustrates the voltage levels, respectively high H and low L, of signal $V_{MD}$. The protocol defines in standardized fashion a voltage range for the low and high levels of the periodic signal (between a level $V_{OLmin}$ and a level $V_{OLmax}$ for low level L and between a level $V_{OHmin}$ and a level $V_{OHmax}$ for high level H). In a specific example (SWP standard for a supply voltage Vdd ranging between 1.62 and 1.98 volt (class C)), levels $V_{OHmax}$ and $V_{OHmin}$ respectively are Vdd (for example, 1.98 volt) and 0.85*Vdd (for example, 1.377 volt) and level $V_{OLmax}$ is 0.15*Vdd (for example, 0.297 volt), level $V_{OLmin}$ being the ground (0 volt).

FIG. 4B illustrates the voltage ranges of a signal $V_{SD}$ corresponding to the input voltage of slave device 14, and thus to the image of signal $V_{MD}$ on the slave device side. These ranges define the voltages within which device 14 considers that the received signal is at a high level H or a low level L. These ranges are defined by levels $V_{ILmin}$ and $V_{ILmax}$ to consider a signal at low level L and levels $V_{IHmin}$ and $V_{IHmax}$ to consider a signal at high level H. Ranges $V_{OLmin}$-$V_{OLmax}$ and $V_{OHmin}$-$V_{OHmax}$ are of course respectively within ranges $V_{ILmin}$-$V_{ILmax}$ and $V_{IHmin}$-$V_{IHmax}$. The detection of the level of signal $V_{SD}$ by the slave device enables it to restore signal S1. Slave device 14 uses this signal both as a signal for synchronizing its exchanges with the master device and, by the durations of the low levels, to detect the data carried by this signal.

FIG. 4C illustrates the charge modulation performed by a slave device 14 on single-wire connection 3 to transmit data to master device 13. This drawing is illustrates ranges $I_{Lmin}$-$I_{Lmax}$ and $I_{Hmin}$-$I_{Hmax}$ of current $I_W$ on line 3, which define binary states 0 and 1 of the data transmitted by the slave device. Referring to the above example of a systematic acquisition program, thresholds $I_{Lmin}$ and $I_{Lmax}$ respectively are 0 and approximately 20 microamperes and thresholds $I_{Hmin}$ and $I_{Hmax}$ respectively are approximately 600 microamperes and approximately 1 milliampere.

In terms of time, slave device 14 uses the time periods for which signal $V_{SD}$ is low to position the charge (and thus define current $I_W$) that it applies on the line. Thus, when master device 13 switches the state of signal $V_{MD}$ to the high state, it can estimate the current on the line.

In usual devices, it can be seen that, to detect this current level, signal $V_{MD}$ must have settled in the high level. This settling time (which depends on the charge applied by the slave device) thus conditions the minimum duration of the high level of signal $V_{MD}$, and thus the minimum duration of the high level for a transmitted bit 0, and thus the system flow rate.

Figure 5:
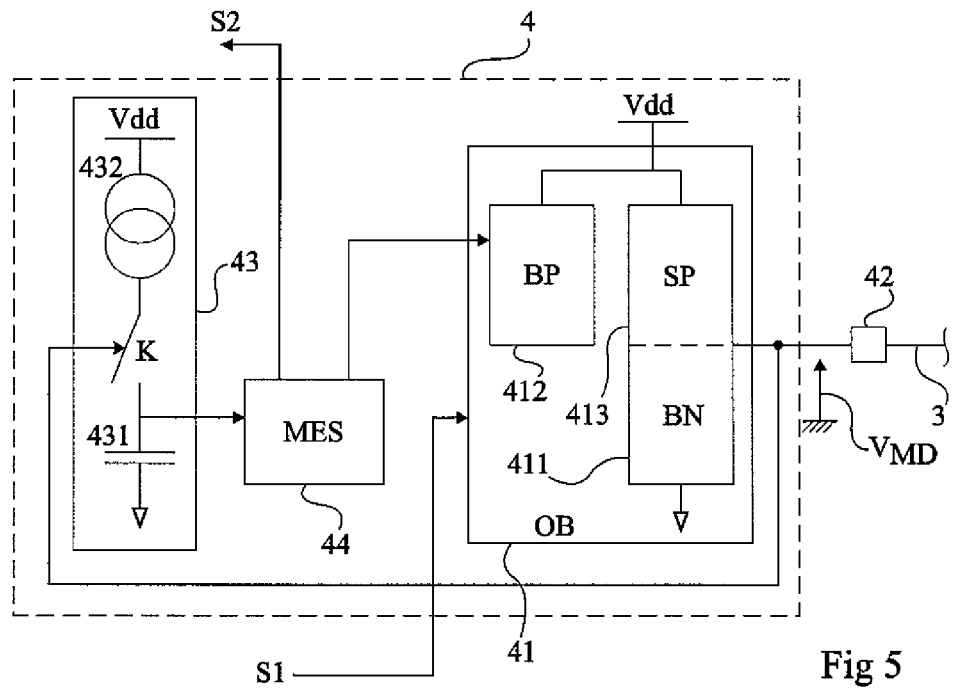
FIG. 5 is a functional partial block diagram of an embodiment of a master device.

FIG. 5 is a partial block diagram of a master device illustrating an embodiment of circuits 4 for transmitting periodic flow S1 and for determining the binary state S2 of data received in return. The signal to be transmitted (for example, the shape of FIG. 3) is provided in the form of a digital train S1 to an output amplifier 41 (Output buffer—OB). This output amplifier provides voltage $V_{MD}$ on a single pad 42 of connection to line 3. The signal present on pad 42 is further used by the master device itself to estimate the slope of the rising edges. In the example of FIG. 5, signal $V_{MD}$ is used to turn on a switch K for charging a capacitive element 431 of a slope detection circuit 43. Switch K and capacitive element 431 are in series with a current source 432 between two terminals of application of a supply voltage Vdd. The charge level of element 431 is estimated by a measurement circuit 44 (MES), which provides a binary signal S2 corresponding to the received data.

FIG. 5 illustrates a preferred embodiment of output amplifier 41 according to which said amplifier modifies its transmission power in the case of a significant charge applied by the slave device. The aim is, once the detection of signal S2 has been performed, to catch up on the relatively strong slope of the rising edge to avoid delaying the settling of a steady level of voltage $V_{MD}$ which is further used on the slave device side to measure the data transmitted in the master-to-slave direction.

Such a functionality is, for example, obtained by switching, in output amplifier 41, circuits for setting to a high level (generally P-channel MOS transistors) and/or circuits for setting to a low level (generally N-channel MOS transistors)

to vary the output power. In the shown example, the presence of a single circuit for setting to a low level 411, sized for a maximum power, and of two circuits 412 and 413 for setting to a high level, respectively sized for a relatively low power (SP) and for a relatively high power (BP), is assumed. For example, different sizes are provided for the P-channel MOS transistors forming circuits 412 and 413, the N-channel MOS transistor forming circuit 411 being of same size as the sum of the sizes of the P-channel transistors. The opposite is of course possible.

The master device starts by transmitting with amplifier 41 configured with low-power circuit 413 so that the signal settling slope is conditioned by the charge present on the line, and thus applied by the slave device. Once the detection has been performed, if measurement device 44 indicates to amplifier 41 the presence of a state 1, amplifier 41 switches to high-power circuit 411. It is then capable of outputting a greater current. Thus, even with a greater charge, the slope of the rising edge becomes sufficient.

The fact of accelerating the rising edge on a significant charge enables increasing the transmission rate.

The switching of output amplifier 41 remains however optional, in particular for the case where this rate increase is not desired. A determination of the state by an interpretation of the slope of the rising edges however makes the system less sensitive to noise.

On the slave device side, the intervention on the slope of the rising edge is by no means prejudicial. On the contrary, the circuits of output amplifier 41 can be sized so that the settling time of signal $V_{MD}$ is identical in the two charge cases by causing a stronger slope at the end of a rising edge on a high charge to join the high level approximately at the same time as in case of a low charge. This leaves more flexibility in the forming of the slave device since it is then possible to indifferently detect the durations of the high or low states therein to restore the periodic signal and decode the received signal.

Figure 6:
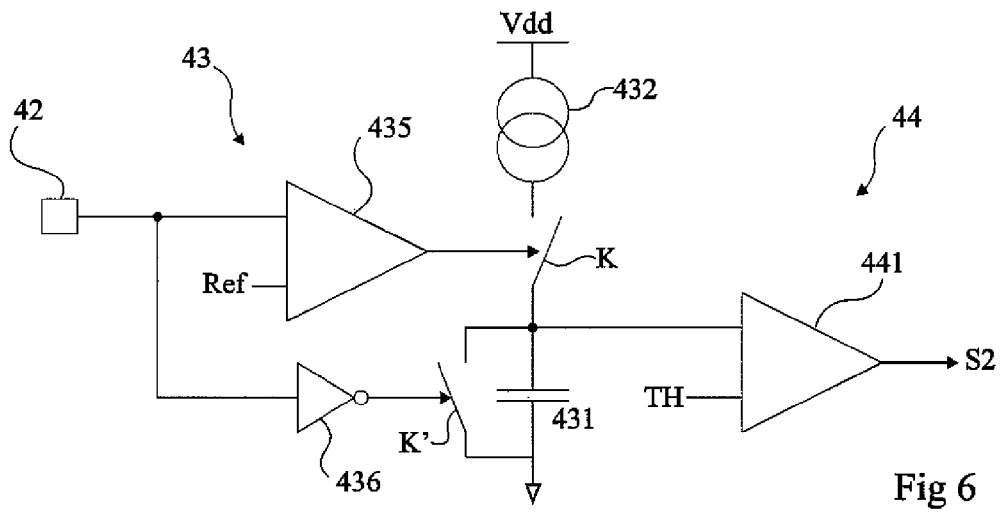
FIG. 6 schematically shows an embodiment of the detection circuit of FIG. 5.

FIG. 6 illustrates an embodiment of circuits 43 and 44 in which switch K (for example, a transistor of MOS or bipolar type) is controlled to be turned off by a comparator 435 of the voltage present on terminal 42 with respect to a threshold Ref. An inverter 436 of the signal on pad 42 controls another switch K' placed in parallel on capacitor 431 to short-circuit it. Thus, when signal $V_{MD}$ is low, switch K' is on. On occurrence of a rising edge of signal $V_{MD}$ (neglecting the settling times of the signals in elements 435 and 436), switch K is on and switch K' is off. Capacitor 431 thus charges. Its charge is interrupted when the level of signal $V_{MD}$ reaches threshold Ref. Circuit 44 comprises a comparator 441 of the voltage level across capacitor 431 with respect to a threshold TH. Comparator 441 provides signal S2.

FIGS. 7A to 7E are timing diagrams illustrating the operation of the circuit of FIG. 6. These timing diagrams respectively show examples of shapes of signal S1 of the master device to transmit a flow 1010, of the charge level R2 exhibited by the slave device on the line to transmit a flow 0011, of voltage $V_{MD}$, of voltage $V_{431}$ across capacitive element 431, and of signal S2 detected by the master device. To simplify the following description, the times of propagation through the circuits have been neglected.

At each period T of signal S1, said signal switches to the high level at a time t1, then to the low level at a time $t2_0$ for the transmission of a 0 or at a subsequent time $t2_1$ for the transmission of a 1. At a time t0 before each time t1, that is, during the portion in low state L of the preceding period T, the slave device positions its charge between a maximum or relatively high charge, for example, to transmit a 1, or a minimum or relatively low charge (as compared with the relatively high charge) to then transmit a 0. This is illustrated by two levels S (low charge) and B (strong charge) of a signal R2 (FIG. 7B). In the example, it is assumed that signal R2 switches from one level to the other if need be at each time t0. Generally in a SWP protocol, there exists a communication wait state in which signals S1 and S2 respectively are 1 and 0. The slave device stops this state by switching its charge.

At each time t1, signal $V_{MD}$ starts increasing, which turns off switch K' (in practice, as soon as the voltage level is sufficient to switch inverter 436) and turns on switch K. The charge of capacitor 431 thus approximately starts at time t1. The slope of voltage $V_{431}$ is set by current source 432, preferably at constant current. However, the slope of voltage $V_{MD}$ depends on level B or S of the charge imposed by the slave device. Advantage is taken from this slope difference to detect the transmitted level 0 or 1.

With a low charge S (transmission of a state 0), the slope is greater than with a strong charge B (transmission of a state 1). Accordingly, voltage $V_{MD}$ reaches threshold Ref at a time $t3_0$, which is sooner than it would reach it (time $t3_1$) in the case of a charge B.

Threshold TH of comparator 441 is selected to be greater than the voltage level reached across capacitor 431 on turning-off of switch K in case of a strong slope of the current (and thus of voltage $V_{MD}$). Accordingly, signal S2 remains at low level L indicating a received binary state 0.

With a greater charge B imposed by the slave device, the slope of signal $V_{MD}$ is lower.

Threshold Ref of comparator 435 is selected so that, in case of a low slope of signal $V_{MD}$, voltage $V_{431}$ across capacitor 431 reaches threshold TH before voltage $V_{MD}$ has reached threshold Ref. Accordingly, comparator 441 switches at a time $t4_1$, which causes the switching to the high state of signal S2, indicating a binary state 1.

In a simplified embodiment, amplifier 41 does not modify its output power and voltage $V_{MD}$ reaches level Ref at time $t3_1$. Switch K turns off and the charge of capacitor 431 stops.

In the shown preferred embodiment, the switching of signal S2 at time $t4_1$ causes the switching of output amplifier 41 (FIG. 5) to a greater power. Accordingly, a change of slope of the rising edge of signal $V_{MD}$ (or $I_W$) can be observed, said signal then reaching the high level faster. This results in a sooner stopping of the charge of capacitor 431.

On each falling edge (times $t2_0$, $t2_1$) of signal S1, capacitor 431 is reset (discharged) by the turning-on of switch K'.

An advantage of an interruption of the charge of capacitor 431 is that this decreases the power consumption of the detection circuit.

The synchronization of the different circuits is not a problem since on the master device side, said device manages the synchronizing, not only of its own circuits, but also of those of the slave device.

Various embodiments have been described and different variations and modifications are within the abilities of those skilled in the art. In particular, the selection of the synchronization times and of the voltage levels and thresholds is within the abilities of those skilled in the art based on the functional indications given hereabove and on the application. Further, the practical implementation of the present invention based on the functional indications given hereabove is also within the abilities of those skilled in the art and especially the forming of the amplifier output stages of different gains. Further, the illustrated binary states 0 and 1 are conventions and may be inverted.

Such alterations, modifications, and improvements are intended to be part of this disclosure, and are intended to be within the spirit and the scope of the present invention.

Accordingly, the foregoing description is by way of example only and is not intended to be limiting The present invention is limited only as defined in the following claims and the equivalents thereto.

What is claimed is:

1. A method for determining, by a first device capable of transmitting a two-state signal over a single-wire connection to a second device, the binary state of data transmitted by the second device over said connection, comprising:
   the second device transmitting data to the first device, simultaneously with the first device transmitting the two-state signal to the second device, by modulating a charge on the single-wire connection, the charge modulation causing a variation of a slope of a rising edge of the two state signal according to the binary state of the data transmitted by the second device;
   the first device determining the slope of the rising edge of the two-state signal; and
   the first device determining the binary state of the data transmitted by the second device according to the determined slope of the two-state signal.

2. The method of claim 1, wherein the slope is determined based on the charge level of a capacitive element on occurrence of a rising edge.

3. The method of claim 2, wherein the charge level is compared with a threshold to determine the received state.

4. The method of claim 1, wherein the slope of the rising edge is broken for a first binary state and even for a second state.

5. The method of claim 1, wherein the second device modulates the charge exhibited on the connection according to the transmitted binary state.

6. The method of claim 1, wherein said signal is used as a clock signal by the second device.

7. The method of claim 1, wherein said signal has its duty cycle modulated according to data to be transmitted from the first device to the second device.

8. A system of simultaneous bidirectional transmission over a single-wire connection between a first device and a second device, wherein the first device is adapted to an implementation of the method of claim 1.

9. A first device of transmission-reception over a single-wire connection, capable of transmitting a two-state signal to a second device, the second device configured to transmit data to the first device, simultaneously with the first device transmitting the two-state signal to the second device, by modulating a charge on the single-wire connection, the charge modulation causing a variation of a slope of a rising edge of the two-state signal according to the binary state of the data transmitted by the second device, the first device comprising:
   an element of the first device for measuring information representative of the slope of the rising edges of said two-state signal; and
   an element of the first device for comparing said information with a threshold, for determining said binary data state.

10. The device of claim 9, further comprising an element for switching the power of an amplifier for transmitting said signal, which is activated after detection of a state corresponding to a charge of the second device.

11. A method for determining, by a first device configured to transmit a two-state signal over a single-wire connection to a second device, a binary state of data transmitted by the second device over the single-wire connection, comprising:
   transmitting, by the first device, the two-state signal over the single-wire connection to the second device;
   transmitting, by the second device, data to the first device, simultaneously with the first device transmitting the two-state signal to the second device, by modulating a charge on the single-wire connection, the charge modulation causing a variation of a slope of a rising edge of the two-state signal according to the binary state of the data transmitted by the second device;
   measuring, by the first device, the slope of the rising edge of the two-state signal; and
   determining, by the first device, the binary state of the data transmitted by the second device to the first device based on the measured slope of the rising edge of the two-state signal.

12. A method as defined in claim 11, wherein measuring comprises charging a capacitor until the rising edge of the two-state signal exceeds a reference voltage.

13. A method as defined in claim 12, wherein determining comprises comparing a voltage on the capacitor with a threshold, the binary state of the data transmitted by the second device based on whether the voltage on the capacitor exceeds the threshold.

14. A method as defined in claim 12, further comprising discharging the capacitor when the two-state signal is low.

15. A method as defined in claim 11, further comprising increasing the slope of the rising edge of the two-state signal after the binary state of the data is detected.

16. A method as defined in claim 11, wherein the first device transmits data to the second device by modulating a duty cycle of the two-state signal.

17. A first device configured to communicate with a second device on a single-wire connection, comprising:
   an output circuit configured to transmit a two-state signal over the single-wire connection to the second device, the second device configured to transmit data to the first device, simultaneously with the first device transmitting the two-state signal to the second device, by modulating a charge on the single-wire connection the charge modulation causing a variation of a slope of a rising edge of the two-state signal according to the binary state of the data transmitted by the second device;
   a first circuit configured to determine information representative of the slope of the rising edge of the two-state signal; and
   a second circuit configured to determine a binary state of data transmitted by the second device to the first device based on the determined information representative of the slope of the rising edge of the two-state signal.

18. A first device as defined in claim 17, wherein the first circuit includes a capacitor, a current source coupled to the capacitor and a circuit configured to enable charging of the capacitor by the current source until the rising edge of the two-state signal exceeds a reference voltage.

19. A first device as defined in claim 18, wherein the first circuit further includes a switching circuit to discharge the capacitor when the two-state signal is low.

20. A first device as defined in claim 18, wherein the second circuit includes a comparator configured to compare a voltage on the capacitor with a threshold, the binary state of the data transmitted by the second device based on whether the voltage on the capacitor exceeds the threshold.

21. A first device as defined in claim 17, wherein the output circuit is configured to increase the slope of the rising edge of the two-state signal after the binary state of the data is determined.

22. A first device as defined in claim 17, configured to transmit data to the second device by modulating a duty cycle of the two-state signal.

\* \* \* \* \*